United States Patent [19]

Janssen

[11] Patent Number: 4,499,132

[45] Date of Patent: Feb. 12, 1985

[54] VISIBLE INDEXES

[76] Inventor: Alexander P. Janssen, 28 Old Farm Rd., Bellair, Charlottesville, Va. 22903

[21] Appl. No.: 228,358

[22] Filed: Jan. 26, 1981

Related U.S. Application Data

[63] Continuation of Ser. No. 98,836, Nov. 30, 1979, abandoned, which is a continuation of Ser. No. 795,881, May 11, 1977, abandoned, which is a continuation of Ser. No. 505,078, Sep. 11, 1974, abandoned.

[51] Int. Cl.[3] .......................... B32B 3/14; B32B 3/16

[52] U.S. Cl. .................................... 428/77; 428/526; 428/530; 428/535; 428/537.5; 428/354; 40/2 R

[58] Field of Search .................... 428/41, 42, 47, 354, 428/353, 54, 55, 77, 535, 537, 530, 526, 201, 202; 283/36, 37, 21, 41; 282/29 C; 40/2 R, 23 A; 206/813, 820, 460; 156/344

[56] References Cited

U.S. PATENT DOCUMENTS

| | | | |
|---|---|---|---|
| 1,185,538 | 5/1916 | Rand | 206/460 |
| 1,321,557 | 11/1919 | Sampson | 282/29 C |
| 1,587,133 | 6/1926 | Anhof | 283/1 A |
| 2,088,039 | 7/1937 | Scoville | 282/29 C |
| 2,147,817 | 2/1939 | Johnson | 156/71 |
| 2,201,950 | 5/1940 | Wolters et al. | 428/43 |
| 2,351,498 | 6/1944 | Fowler | 156/247 |
| 2,477,196 | 7/1949 | Mohr | 156/254 |
| 3,275,469 | 9/1966 | Streit | 428/350 |
| 3,674,614 | 7/1972 | Templeton | 428/43 |
| 3,690,985 | 9/1972 | Price | 156/254 |
| 3,769,143 | 10/1973 | Kulesza | 156/154 |
| 3,837,999 | 9/1974 | Chung | 162/101 |
| 4,250,216 | 2/1981 | Janssen | 428/78 |

*Primary Examiner*—Alexander S. Thomas

*Attorney, Agent, or Firm*—LeBlanc, Nolan, Shur & Nies

[57] ABSTRACT

A visible index and components therefor including index strip supports of simplified and rugged construction and several forms of replaceable strips which may or may not be preprinted and which can, at least in most cases, be produced at a lower cost than previously patented index strips. The index strips are of multi-ply construction. Assemblages of the index strips and backing members from which the strips can be easily and cleanly separated. The assemblages may be designed to facilitate the mechanical printing of wanted information on the index strips before they are separated.

2 Claims, 11 Drawing Figures

VISIBLE INDEXES

This is a continuation of application Ser. No. 98,836 filed Nov. 30, 1979, now abandoned, which is a continuation of application no. 795,881 filed May 11, 1977 (now abandoned) which is a continuation of application no. 505,078 filed September 11, 1974 (now abandoned).

This invention relates to the display of information and, more particularly, to novel, improved information display systems of the visible index type.

Visible indexes have seen widespread use for many years. Such indexes typically include a stand to which a number of frames or supports can be attached. These frames consist of a strip supporting panel extending between side members having recesses into which the ends of narrow, elongated, flexible index strips bearing the wanted information can be inserted to detachably secure the strips in place.

The index strips can consequently be readily removed and replaced or relocated, making it relatively easy to keep the index current. At the same time the information is available in a highly accessible form.

The index strips for systems of the type just described have heretofore been made of paper convered wood veneer. They are typically secured to a backing sheet to facilitate handling and the typing or other machine printing of the wanted information on them. They are then separated for attachment to the frame or support by rupturing the backing sheet or detaching them from it.

A number of patents deal with visible index systems, with supports and strips of such systems, and with assemblages of the latter and a backing sheet. Among these are U.S. Pat. Nos. 499,442 issued June 13, 1893; 1,123,215 issued Jan. 5, 1915; 1,183,370 issued May 16, 1916; 1,185,538 issued May 30, 1916; 1,227,661 issued May 29, 1917; 1,244,622 issued Oct. 30, 1917; 1,285,760 issued Nov. 26, 1918; 1,329,568 issued Feb. 3, 1920; 1,462,497 issued July 24, 1923; 1,504,709 issued Aug. 12, 1924; 1,511,750 issued Oct. 14, 1924; 1,518,354 issued Dec. 9, 1924; 1,525,079 issued Feb. 3, 1925; 1,529,212 issued Mar. 10, 1925; 1,554,087 issued Sept. 15,1925; 1,589,556 issued June 22, 1926; 1,594,112 issued July 27, 1926; 1,695,328 issued Dec. 18, 1928; 1,574,931 issued Mar. 2, 1926; 1,774,241 issued Aug. 26, 1930; 1,809,066 issued June 9, 1931; 1,854,807 issued Apr. 19, 1932; 2,058,035 issued Oct. 20, 1936; 2,201,950 issued May 21, 1940; 2,385,082 issued Sept. 18, 1945; 2,529,926 issued Nov. 14, 1950; 2,574,068 issued Apr. 3, 1951; 2,552,270 issued Sept. 8, 1953; 2,732,822 issued Jan. 31, 1956; and 2,832,712 issued Apr. 29, 1958.

I have now invented a novel visible index which differs in certain important respects from those heretofore available.

One is that the flexible index strips can be made entirely of paper. Even though I use a multi-ply construction, this has the advantage of reducing the cost to below that of the heretofore employed wood veneer strips.

I prefer to use in one or more of the plies papers in which the fibers are predominantly oriented in one direction so that, in the index strips, they can be made to extend in the same direction as the longitudinal axes of the strips. This has unexpectedly been found to impart maximum strength and flexibility to the strips.

It has heretofore been suggested that visible index strips could be made of paper (see the above-cited U.S.

Pat. Nos. 1,123,215; 1,185,538; 1,329,568; 1,511,750; 1,525,059; 1,589,556; 1,058,035; and 2,201,950). With the exception of that last listed, however, the foregoing patents suggest only that the strip be made of a single ply of heavy paper or cardboard. Such strips would not have the strength or flexibility I consider necessary, and this is apparently concurred in by others as I am not aware of such strips being commercially available.

U.S. Pat. No. 2,201,950 does speak of strips having an intermediate layer, which may be cardboard, and an outer layer of paper. The function of the outer layer is only to provide a writing surface, however.

Furthermore, I preferably employ in at least one of the plies paper of a character quite different from any suggested in U.S. Pat. No. 2,201,950 or the other patents listed above; viz., a paper such as those described in U.S. Pat. No. 3,769,143, issued Oct. 30, 1973, which is hereby incorporated by reference. Such papers are composed of a fibrous mat impregnated with a partially cured, resin-modified, cross-linked, urea-formaldehyde resin. The modifier resin is a polymerized, ethylenically unsaturated monomer and contains chain-pendant methylol groups. The urea-formaldehyde contains ca. 1.3 to 2.2 mols of formaldehyde per mol of urea, and the paper contains ca. 25 to 75 percent by weight of the modified urea-formaldehyde resin. These papers have properties which, for my purposes, surpass those of wood veneers and other papers; and they do not have certain disadvantages appurtenant to these materials. For example, they are harder and less brittle than wood veneers and are free of knotholes, irregular grains, and surface blemishes.

Another, optional feature of my novel index strips is a permanent, longitudinal bow or curve. Strips of this character are mounted in the supporting frame with the convex side of the strip facing the flat panel of the frame. The stress created when the strip is straightened by inserting its ends into the recesses of the frame side members causes the strip to stay in place and to lie flat against the panel. This enhances the appearance of the index and also minimizes the possibility of a strip projecting and being accidentally damaged or dislodged.

The provision of a bowed index strip is not as such claimed to be novel as such strips are described in the above-cited U.S. Pat. Nos. 1,462,497 and 1,525,079. However, no one has heretofore suggested that multiply, all-paper index strips could be given this configuration or even that paper could be so configured at all without specially treating it—for example, by dipping it in colloidon as suggested in U.S. Pat. No. 1,525,079.

As discussed above, strips for visible indexes are typically supplied in groups attached to a paper backing sheet. This facilitates the handling of the strips, especially through typewriters, computer printers, and other machines for printing information on them. As also memtioned, the strips are then detached, either by tearing the backing sheet or by separating them from it.

Both arrangements have their disadvantages. The first leaves ragged edges on the strips; and these are, at best, unsightly.

In the second type of assemblage, glue lines secure the index strips to the backing sheet. When the strips are detached, the backing sheet is often torn in the vivinity of these glue lines and adheres to the index strips, detracting from the appearance of the strips.

In many of their preferred forms, the novel index strips I have invented do not have either of the disadvantages just mentioned. I avoid these by securing the strips to a backing sheet with a releasable adhesive. By this I mean one which forms with the materials being secured together a bond that is stronger than the adhesive itself.

Consequently, when the index strips of my novel assemblages are detached from the backing sheet, the adhesive rather than the bond between the latter and the index strip ruptures, leaving the strips free of backing sheet material and with clean edges.

In other words, the releasable adhesive itself is rather fragile or friable and easily ruptures when the index strip is lifted from its backing sheet. One simply holds the backing sheet with the fingers of one hand, grasps the index strip with the fingers of the other hand, and lifts the index strip from the backing sheet. In this manner, the friable releasable adhesive is merely mechanically ruptured as the index strip and backing sheet are separated.

Releasable adhesives also have the advantage that, unlike those of the commercially used pressure sensitive type, they will not transfer to the typewriter or other machine employed for printing information on the index strip.

Although preferred, it is not in all cases essential that this method of bonding the index strips to the backing sheet be employed. Alternate and novel methods of attaching the strips are contemplated and will be described hereinafter.

Assemblages of index strips must be precisely aligned in the typewriter or other printing machine because they may be as little as one-sixth inch wide. The type will therefore run off the strip unless the alignment is exact. Several strips may be wasted in securing the requisite alignment of a conventional assemblage as the typist or other machine operator must approximate the alignment, type a strip, and repeat the process until the exact alignment is secured.

This problem is avoided in my novel index strip assemblages by providing alignment guides on the backing sheet of the assemblage. Typically, these will include lines duplicating the width of the strips or typewriter or other printing machine spacing by which alignment with the strips can be checked and indicia for centering or otherwise positioning the printing along the strip.

This novel arrangement permits the operator to precisely align the assemblage before even the first strip is printed. As a consequence, time is saved, and the wastage of strips is eliminated.

Another advantage of my novel index strip and backing sheet assemblages is that they are useful in applications where large numbers of strips are needed. The information can first be preprinted on the exposed surface of the assemblage or one of the plies making it up by a computer controlled or other high volume printing machine and the strip forming plies then split to form the strips. Strips can be provided in large quantities and at low cost in this manner.

Also, because only a single and therefore relatively flexible ply has to be processed through the printing machine, the "ghosting" or printing of multiple images which occurs when stiff materials are fed through high speed printers is substantially reduced, if not entirely eliminated.

In another aspect my invention resides in the provision of novel supports or frames for visible index systems. These are the components in which the strips are removably supported; and, as indicated above, they typically include a sheet metal panel extending between side members having inwardly facing recesses for the ends of the strips, generally on both sides of the panel.

Heretofore, the side members of the frame have been of two-and three-piece construction as shown by the above-cited U.S. Pat. Nos. 1,504,709; 1,809,066; and 2,552,270 or of a one-piece construction which requires a complicated forming operation. I have now discovered that the side members of the frame can instead be a unitary member of a configuration that can be readily extruded or otherwise formed in a simple manner from both metals and non-metals. The result is a substantial saving in cost.

In addition the panels of my index supports are of novel construction which makes my improved side members practicable. They have folded edges which fit into the side members and make it possible to give to the latter a configuration which can be readily extruded.

Also, the upper and lower edges of my novel panels have a boxlike configuration. This forms index strip retaining flanges which keep the strips from sliding out the top or bottom of the panel and eliminate the separate panel members conventionally employed for this purpose.

In an associated aspect of the invention, I have developed a novel index strip which can be employed to advantage with my novel visible index frames. One or more plies constituting the body of the strip are dimensioned to fit into the strip receiving recesses of the frame side members. A further ply or multi-ply portion of the strip extends between these members with its exposed surface flush with the sides of these members.

From the foregoing it will be apparent to the reader that important and primary objects of the invention reside in the provision of novel, improved index strips for information display systems of the visible index type and in the provision of novel, improved assemblages of such strips with a backing sheet.

Related and also important but more specific objects of the invention reside in the provision of visible index strips:

(1) which are of multi-ply construction and are constructed entirely of paper;

(2) in which, in conjunction with the preceding object, the fibers in the several plies are oriented in a direction providing maximum strength and flexibility;

(3) which employ papers having physical characteristics superior to those papers heretofore employed in or suggested for use in visible index strips;

(4) which, in conjuction with the three preceding objects, are provided with a permanent longitudinal bow or curve so that they can be made to lie flat when installed in a visible index system frame or support;

(5) which can be supplied at a significantly lower cost than wood veneer based strips;

(6) which will lie flush with the side members of a visible index frame or support.

Other important and more specific objects of my invention reside in the provision of index strip and backing sheet assemblages:

(7) which permit the index strips to be separated without adhering backing sheet material to them and without leaving ragged edges;

(8) in which, in conjunction with the preceding object, the strips are bonded to the backing sheet with an adhesive capable of forming with the strips and backing sheet bonds which are stronger than the adhesive itself;

(9) in which the backing sheet has guides that permit the assemblage to be precisely aligned in a typewriter or other printing machine before information is printed on a strip;

(10) which are particularly suitable for applications where large numbers of index strips are needed;

(11) which, in conjunction with the preceding object, are so constructed that the wanted information can be imprinted before the index strip forming plies are severed into strips.

Yet another important object of my invention is the provision of novel, improved index strip frames or supports for visible index systems.

Related, but more specific objects reside in the provision of index strip frames or supports:

(12) which can be manufactured at reduced cost;

(13) in which, in conjunction with the preceding object, the side members of the support are of one-piece or unitary construction and of a configuration which can be readily produced by extrusion and other inexpensive techniques;

(14) which have novel panels that make the aforesaid novel side member construction practicable and, in addition, are of a unitary construction rather than the multi-piece nature of those currently available.

Other important objects and features and additional objects of my invention will become apparent from the appended claims and as the ensuing detailed description and discussion proceeds in conjunction with the accompanying drawing, in which:

Figure 1:
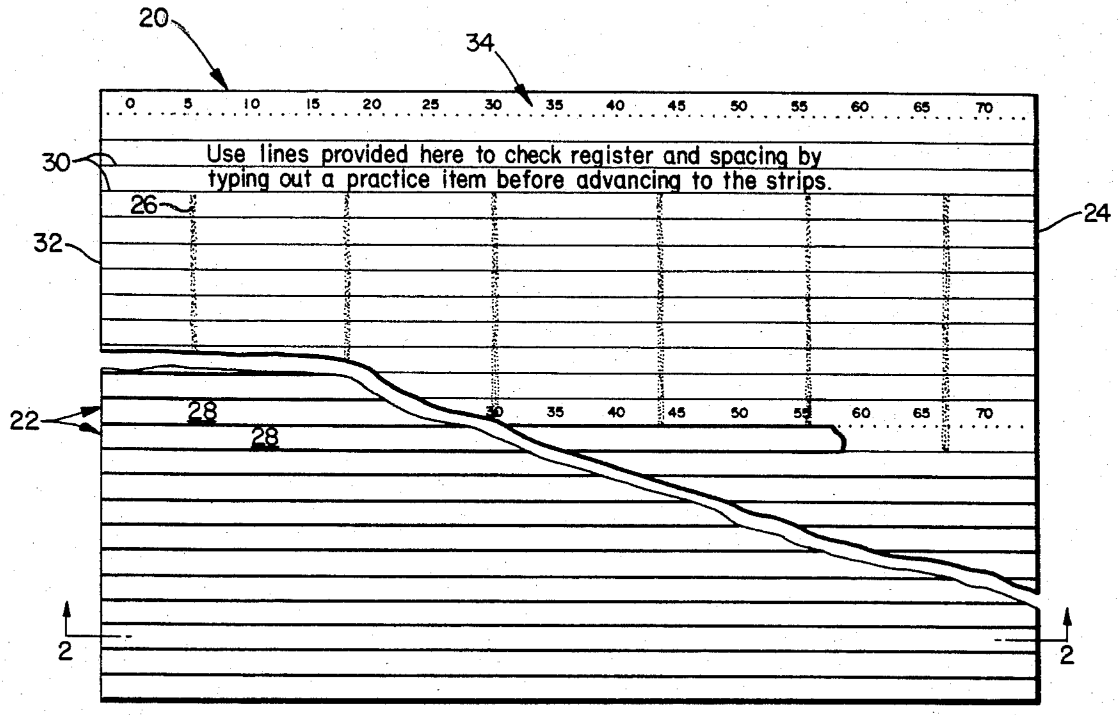
FIG. 1 is a plan view of an assemblage of visible index strips, both the assemblage and the strips being constructed in accord with the principles of the present invention.
Figure 2:
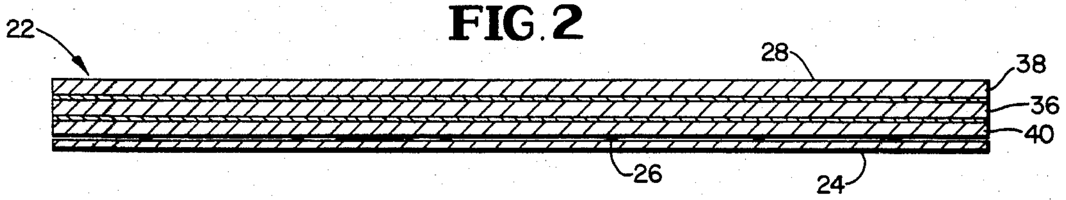
FIG. 2 is a section through the assemblage and one of the index strips and is taken substantially along line 2—2 of FIG. 1.

Referring now to the drawing, FIGS. 1 and 2 depict a visible index strip assemblage 20 constructed in accord with and embodying the priniciples of the present invention. The assemblage includes a plurality of elongated, flexible index strips 22 bonded to a backing sheet 24 by spaced lines 26 of a releasable adhesive. As discussed above, a releasable adhesive is one which forms with the backing sheet and with the index strips a bond stronger than the adhesive itself so that the adhesive rather than one of the foregoing bonds will rupture when an index strip is detached from backing sheet 24.

One suitable adhesive of this type is H.B. Fuller Company Product No. G-3117-X. Other adhesives of this character are also commercially available and may be used instead, if desired. Also, a solid layer of releasable adhesive can be employed rather than spaced apart lines.

Index strips 22 may be as narrow as one-sixth inch which means that they must be precisely aligned in a typewriter or other machine printing device to apply the wanted information to their information receiving surfaces 28. Conventionally, this is accomplished by inserting the assemblage in the machine in what is estimated to be the correct alignment, checking the alignment by typing the information on a strip, correcting the alignment, and repeating the process until the correct alignment is obtained. This not only wastes time but can result in the loss of several strips.

In assemblage 20, this loss of time and index strips is avoided by providing alignment guides 30 on an exposed end portion 32 of backing sheet 24. Guides 30 are parallel to the edges of strips 22 and spaced the same distance apart or at typewriter or other printing machine spacing. Accordingly, the assemblage 20 may be aligned by using guides 30 and the spaces therebetween rather than strips 22 and the assemblage then advanced to the first strip 22 to apply the wanted information to it.

The exposed lead end of the backing sheet also facilitates inserting the assemblage into and aligning it in a typewriter or other printing machine.

In addition to alignment guides 30, a scale 34 will typically be provided on backing sheet 24 at intervals as shown in FIG. 1. The increments or divisions of this scale duplicate those found on a typewriter or other printing machine. Scales 34 permit the information wanted on a strip to be easily centered on or otherwise spaced along it.

The index strips 22 of assemblage 20 may be made of any desired material such as a suitable plastic or the conventional paper covered wood veneer, but will preferably be of the novel, multi-ply, all paper construction shown in FIG. 2. Strips 22 are of three-ply construction and include a central ply 36, an outer or top ply 38 which bears the information receiving surface 28, and a second or bottom ply 40 to which the backing sheet 24 is bonded.

In one exemplary index strip of this type, outer, top ply 38 is 0.0085 inch thick Riegel Jersey Plate Bristol. The central ply is 0.014 inch thick International Paper Company Luxcell resin impregnated paper, and the third, bottom ply 40 is 0.007 inch thick Riegel Jute Tag Paper. The backing sheet is 0.009 inch thick Riegel Jute Tag Paper.

One or more of the papers making up index strips 22 can advantageously be of the type in which the paper fibers are for the most part (80 percent or more) oriented in one direction. In making assemblage 20, the ply or plies of this character are oriented so that the fibers will extend in the same direction as the longitudinal axes of the strips. It has been found that this provides maximum strength and, also, sufficient flexibility that the strips can be bent to the extent necessary to insert them in a frame or support without exceeding their elastic limit.

Furthermore, as mentioned previously and as illustrated by the exemplary construction set forth above, one of the papers employed in the index strip can advantageously be of the thermosetting resin impregated type. The resin can be a urea formaldehyde cross-linked with a vinyl or acrylic polymer or copolymer. Such papers are described in detail above and in even more detail in U.S. Pat. No. 3,769,143 and are marketed by the International Paper Company, the patent owner under the name Luxcell.

The three plies 36, 38, and 40 of the strips can be bonded together by any of a number of adhesives. One which is particularly suitable because of its contribution to the strength and resiliency of the strips is H. B. Fuller Company Product G-1925.

Assamblage 20 is made by bonding the several plies or laminae 36, 38, and 40 together and to backing sheet 24. The strips are then typically formed by scoring the resulting assembly along parallel lines—by using rotary slitters as described in the above-cited U.S. Pat. No. 2,385,082, for example. The depth to which the assembly is scored is not critical. The score lines can extend to or through glue lines 26 or even into the backing sheet 24 as long as the structural integrity of the latter is retained.

It is preferred, though by no means essential, that a permanent, longitudinally extending bow or curve be imparted to the index strips of the assemblage. As discussed above, this assists in keeping the strips flat when they are assembled in the index frame or support. This curve can be set into the strips in the course of bonding the plies 36, 38, and 40 together or in any other desired manner.

It is preferred that the papers making up the strip be at least 0.003–0.004 inch thick. The total thickness of the index strips may vary, but will preferably be on the order of 0.03 inch to make them compatible with existing index strip supports.

Figure 3:
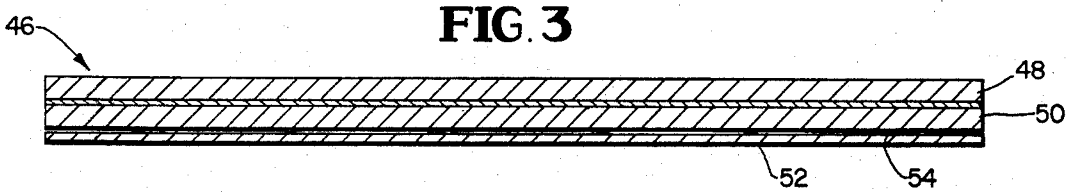
FIGS. 3 and 4 are views similar to FIG. 2 of other index strips and assemblages thereof constructed in accord with the principles of the present invention.

Referring again to the drawing, FIG. 3 depicts an index strip 46 which differs from that shown in FIG. 2 in that it is of two- rather than three-ply construction. The two plies of the index strip are identified by reference characters 48 and 50 and the backing sheet and lines of releasable glue by reference characters 52 and 54, respectively.

If this type of construction is employed, each of the two plies 48 and 50 will preferably be made of paper ranging in thickness from 0.007 to 0.022 inch. Here again, the total thickness of the sheet will be kept at ca. 0.03 inch for the reason mentioned above.

Figure 4:
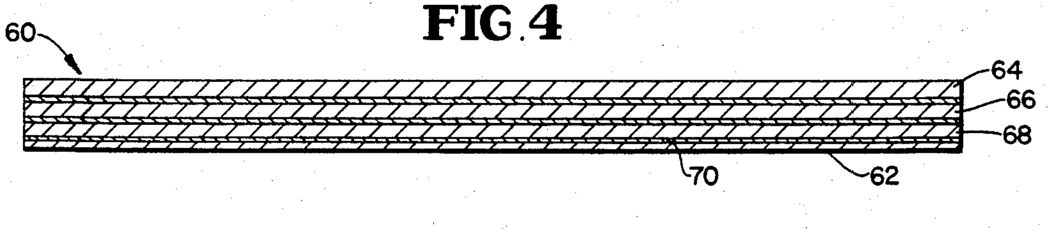

FIG. 4 illustrates an index strip 60 which differs from those previously described in that the backing sheet 62 is an integral part of the strip rather than one from which the strip can be detached. Otherwise, the strip may also consist of three plies 64, 66, and 68 of the same character as the three plies 36, 38, and 40 in index strip 22.

Index strips 60 are made by bonding together the four plies 62 . . . 68. The resulting assemblage is then slit along parallel lines to divide it into strips. These slits may extend to or through the glue line 70 bonding strip ply 68 to backing sheet 62 or, depending upon the thickness of the backing sheet, partially into the latter.

Strips can be removed from the completed assemblage, when wanted, by pulling or snapping them apart to rupture the remaining backing sheet material. To facilitate the detaching of the index strips, backing sheet 62 will typically be of tissue thickness.

In this embodiment, as in the others discussed previously, an all-paper construction is preferred for many applications because of the advantages which this type of construction possesses. Again, however, this construction is not essential; and one or more of the three plies 64, 66, and 68 or even the backing sheet 62 may be made of wood veneer or a plastic or other material.

Figure 5:
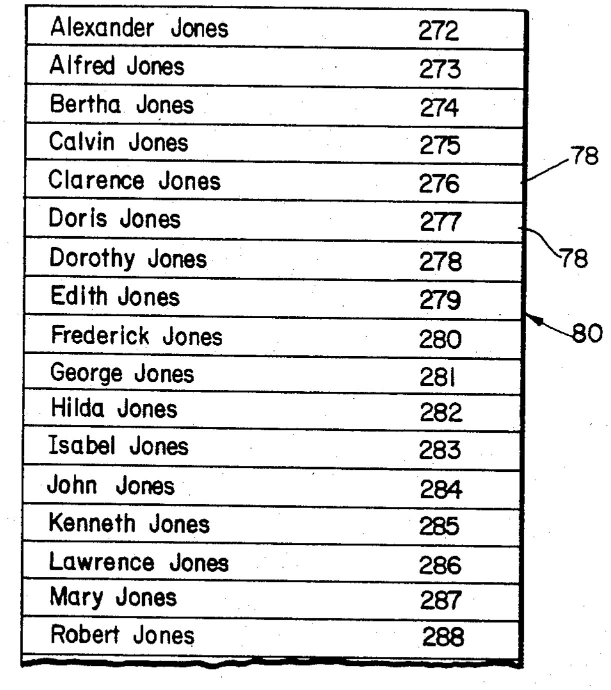
FIG. 5 is a partial plan view of an assemblage of preprinted index strips prepared in accord with the principles of the present invention.

The novel index strip constructions just described lend themselves particularly well to applications where large numbers of strips are required. In this case, the ply bearing the information receiving surface may be preprinted, for example by a computer controlled printing device. The preprinted sheet or strip is then bonded to the remaining ply or plies and the resulting assemblage scored as with rotary slitters to divide the assemblage into strips such as those identified by reference character 78 in FIG. 5. The resulting product will typically by a series of assemblages in sheet form such as that identified by reference character 80 in FIG. 5.

Figure 8:
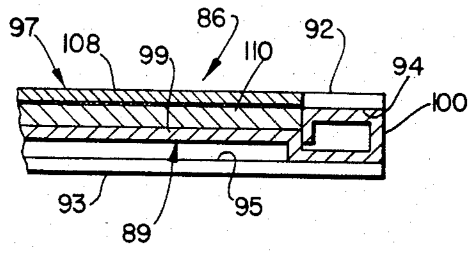
FIG. 8 is a section through the index strip support taken substantially along line 8—8 of FIG. 6.
Figure 6:
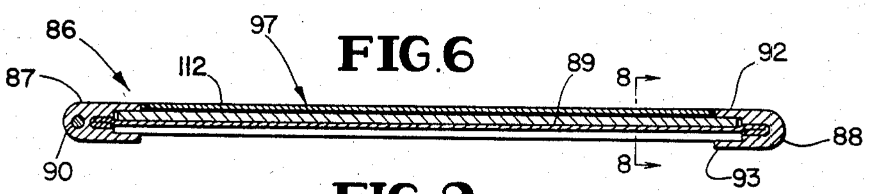
FIG. 6 is a section through a strip support for a visible index system and a visible index strip mounted in the support, both the support and strip being constructed in accord with and embodying the principles of the present invention.

As discussed above, another feature of the present invention is a simplified and more rugged construction of the frame or support in which the index strips are mounted. A support 86 of this construction is shown in FIGS. 6–8.

Support 86 consists of side members 87 and 88 attached to a flat, strip supporting panel 89 typically made of metal or plastic. A pin 90, extending through side member 87 and protruding from its upper and lower ends (or separate pins seated in these ends) will typically be provided to support the frame from a stand such as that shown in the above-cited U.S. Pat. No. 2,589,556 or from any one of the numerous other commercially available frame holders.

Figure 7:
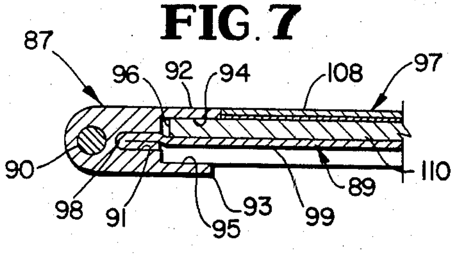
FIG. 7 is a fragment of FIG. 6 to an enlarged scale.

As best shown in FIG. 7, each of the side members 87 and 88 is of one-piece or unitary and monolithic construction and includes a slot 91 into which panel 89 can extend. Each of the side members also includes legs 92 and 93 disposed in parallel, spaced relation to slot 91. These legs co-operate with panel 89 to form recesses 94 and 95 into which the ends 96 of index strips 97 can be inserted to secure the index strips to the frame.

As indicated above, this novel construction has the advantage that the side members are one-piece and, moreover, have a cross sectional configuration which can be supplied by relatively simple manufacturing techniques such as extrusion.

As shown in FIG. 7, the side edges 98 or panels 89 fit into the slots 91 of the side members. These edges are of a folded construction which is symmetrical with the main body 99 of the panel. This arrangement is important in that it permits slots 91 to be made wide enough that the side members 87 and 88 can be extruded.

The upper and lower edges of the panel (only lower edge 100 is shown) are formed into a boxlike configuration centered with respect to the main body 99 of the panel as shown in FIG. 8. The boxlike edges of the panels are dimensioned to fit snugly between the legs 92 and 93 of the side members 87 and 88.

This edge configuration produces flanges 101 and 102 on opposite sides of the panel. These flanges keep the index strips from sliding out of the panel and replace the separate members employed in conventional panels for this purpose.

It will be apparent to those to whom the foregoing is directed that the components of frame 86 can be made of plastics or other non-metals and that side members 87 and 88 do not necessarily have to be extrusions. They could instead, for example, be molded from any one of a number of commercially available plastics.

Referring now to both FIGS. 8 and 7, index strips 97 differ from those discussed previously in that the upper or top ply 108 of the strip is shorter than the lower or bottom ply 110. The upper ply is dimensioned to fit between the cooperating legs 92 (or 93) of the two side members 87 and 88 and is preferably of the same thickness so that its information receiving surface 112 will lie in the same place as the corresponding sides of these members. This provides an attractive appearance and, also, has the advantage that a panel can be reproduced by office copiers as the information bearing surfaces of the strips will contact the document carrier surface of the copier.

The second or bottom ply 110 of the strip will typically be generally equal in thickness to the width of the recesses or slots 94 and 95 and will be sufficiently long to extend into the latter. The upper and lower plies accordingly cooperate to form recesses into which legs 92 and 93 extend to secure the index strips in place.

In the construction just described, the upper ply 108 can be made of a relatively lightweight stock. This is advantageous in that lightweight papers are available in a greater variety of colors, surface finishes, etc. than are the heavier papers required for the bottom ply 110.

It is of course not essential that the frame construction just described be used to support index strips having the novel features disclosed above and hereinafter. Among the frames with which strips manufactured in accord with the principles of the present invention may be employed, for example, are those illustrated in the above-cited U.S. Pat. Nos. 1,511,750 and 1,809,066.

Conversely, index strips intended for use with frames of the type shown in FIGS. 6–8 need not be made in the specific manner just described. They can also be made as discussed elsewhere herein or even by conventional or other prior art techniques.

Figure 9:
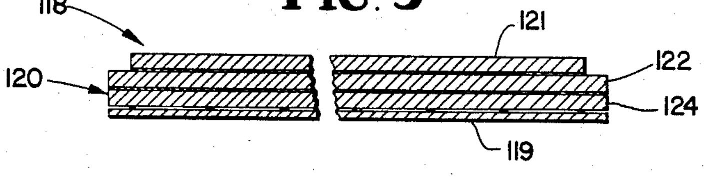
FIG. 9 is a longitudinal section through a second form of index strip intended for use with supports of the type shown in FIG. 6.

FIG. 9 illustrates an index strip 118 which differs from that shown in FIGS. 6 and 7 in that its longer, lower member 120 is of two-ply rather than single ply construction. Index strips 118 and the assemblages in which they are bonded to a backing sheet 119 differ from those described above in conjunction with FIGS. 1 and 2 only in that the upper ply 121 is narrower than the two plies 122 and 124 making up bottom member 120. This allows the completed strips 118 to co-operate with a support of frame of the type shown in FIGS. 6–8 in the manner discussed above.

The construction just described in conjuction with FIGS. 6 and 9 are particularly useful in applications of the type described above where the information is first printed and the strips then formed. In such applications the information is printed by computer or otherwise on the shorter top sheet (108 or 121). The top sheet is then bonded to the remaining ply or plies, and the strip forming plies are then slit between selected lines of the printing to sever the plies into index strips bearing the wanted information.

Figure 10:
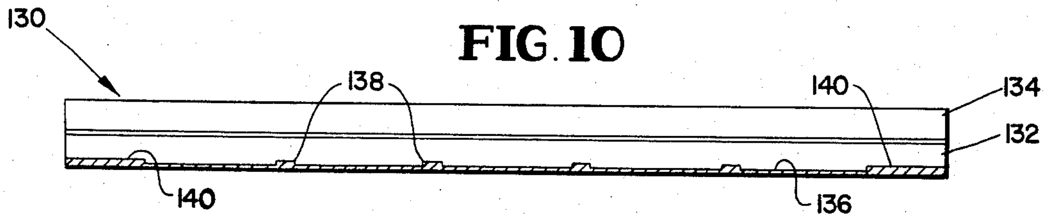
FIGS. 10 and 11 are views similar to FIG. 2 of still other embodiments of the invention.

Referring again to the drawing, FIG. 10 depicts an index strip 130 which is like that shown in FIG. 4 to the extent that the backing member 132 forms one of the plies of the strip. A second ply 134 is bonded to the backing sheet.

In this construction, the two sheets making up the strips are scored along parallel lines through ply 134 and part way through backing sheet 132, leaving a narrow web 136 between adjacent strips. Also, the scoring is partially interrupted at intervals, leaving tabs 138 between adjacent strips at intervals therealong and tabs 140 at the ends of the strips to keep the edges of the assemblage aligned.

Strips 130 are separated from the assemblage thereof by pulling them apart to rupture tabs 138 and 140 and web 136.

Figure 11:
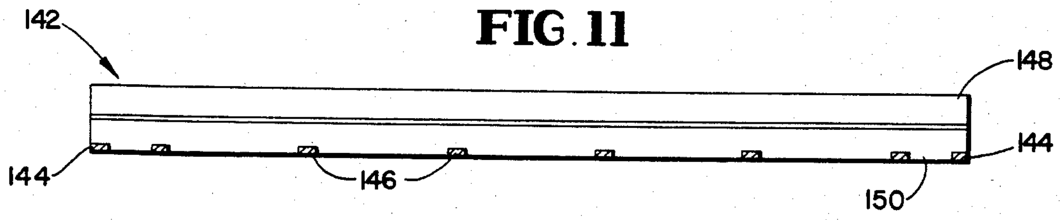

A related construction is shown in FIG. 11. The strips 142 shown in this figure, however, are held together only by tabs 144 and 146 of the type described above. The scoring between adjacent strips otherwise extends completely through the two plies or sheets 148 and 150 making up the strips.

For many applications of the invention, a tab arrangement for holding the strips in assembled relationship will prove inferior to the technique discussed in conjunction with the assemblage shown in FIG. 1. This is because of the difficulty and corresponding cost of scoring the sheets making up the strips in such a manner as to leave the tabs (or tabs and web) and because of the ragged areas which may result when the strips are separated.

Again, as in the rest of the index strip constructions previously described, an all-paper construction will typically be employed because of the advantages this provides. Nevertheless, as in the case of the other index strips disclosed herein, one or more of the laminae making up the strip may instead be wood veneer or a plastic or other material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. The combination of a plurality of separate and independent index strips, a backing sheet, and means for removably attaching said index strips in juxtaposed relationship to said backing sheet, said index strips being of multiple ply construction and comprising: a first ply composed of a fibrous, cellulosic mat impregnated with from 25 to 75 percent by weight of a partially cured, resin modified, cross-linked urea formaldehyde resin; a second ply made of paper; means bonding said second ply in face-to-face relationship with said first ply, thereby leaving exposed a surface of the second ply; a third ply made of paper; and means bonding said third ply in face-to-face relationship to said first ply on the opposite side thereof from the second ply to thereby promote the desirable physical characteristics of the index strip and the means removably attaching said index strips to said backing sheet comprising a releasable adhesive which, in the aforesaid combination, extends between and into contact with said index strips and said backing sheet and has an adhesive strength with respect to said strips and said backing sheet which is greater than its cohesive strength, the adhesive forming with said backing sheet and said index strips bonds which have greater strength than the adhesive and permit said strips to be detached from the backing sheet by merely mechanically rupturing the adhesive and without tearing or otherwise damaging the strips or removing backing sheet mterial with the strips.

2. The combination of a plurality of separate and independent index strips, a backing sheet, and means removably attaching said index strips in juxtaposed, face-to-face relationship to said backing sheet, said last-mentioned means being an interfacial layer of a friable releasable adhesive which, in the aforesaid combination, extends between and into contact with said index strips and said backing sheet and has an adhesive strength with respect to said strips and to said backing sheet which is greater than its cohesive strength, said adhesive forming with said backing sheet and said index strip bonds which have greater strength than the adhesive and permit said strips to be detached from the backing sheet by merely mechanically rupturing the adhesive and without tearing or otherwise damaging the strips or removing torn backing sheet material with the strips, the index strips being of two-ply construction, one of said plies being composed of a fibrous, cellulosic mat impregnated with from 25 to 75 percent by weight of a partially cured, resin modified, cross-linked urea-formaldehyde resin, the other of said plies being made of paper, and said plies being bonded together in face-to-face relationship.

* * * * *